(12) United States Patent
Eloo et al.

(10) Patent No.: US 9,873,220 B2
(45) Date of Patent: Jan. 23, 2018

(54) MELT PROCESSING PLANT

(75) Inventors: Michael Eloo, Xanten (DE); Juergen Veltel, Kevelaer (DE)

(73) Assignee: GALA INDUSTRIES, INC., Eagle Rock, VA (US)

( * ) Notice: Subject to any disclaimer, the term of this patent is extended or adjusted under 35 U.S.C. 154(b) by 713 days.

(21) Appl. No.: 14/239,842

(22) PCT Filed: Jun. 26, 2012

(86) PCT No.: PCT/EP2012/002687
§ 371 (c)(1),
(2), (4) Date: Feb. 20, 2014

(87) PCT Pub. No.: WO2013/026506
PCT Pub. Date: Feb. 28, 2013

(65) Prior Publication Data
US 2014/0175695 A1 Jun. 26, 2014

(30) Foreign Application Priority Data
Aug. 25, 2011 (DE) .................... 20 2011 104 968 U

(51) Int. Cl.
*B29C 47/00* (2006.01)
*B29B 17/00* (2006.01)
(Continued)

(52) U.S. Cl.
CPC .......... *B29C 47/0066* (2013.01); *B29B 9/065* (2013.01); *B29B 17/0005* (2013.01); *B29C 47/0011* (2013.01); *B29C 47/0023* (2013.01); *B29C 47/0026* (2013.01); *B29C 47/0893* (2013.01); *B29C 47/8805* (2013.01); *B29C 47/8815* (2013.01); *B29C 47/8895* (2013.01); (Continued)

(58) Field of Classification Search
None
See application file for complete search history.

(56) References Cited

U.S. PATENT DOCUMENTS 4,028,024 A * 6/1977 Moreland ................. A61J 3/07
425/133.1
5,143,673 A 9/1992 Grimminger
(Continued)

FOREIGN PATENT DOCUMENTS

CN 101119832 2/2008
DE 41 30 002 9/1992
(Continued)

*Primary Examiner* — Monica Huson
(74) *Attorney, Agent, or Firm* — Jacobson Holman, PLLC

(57) ABSTRACT

A melt processing plant including a melt charger for charging a processing head, in particular a pelletizing head, with melt, is provided. Upstream of the processing head a diverter valve for discharging the melt during a starting and/or retooling phase is associated with the melt charger, and a portioning device for portioning the discharged melt into melt portions is associated to the diverter valve. A cooling device for cooling the melt portions to at least partly solidified chunks of material is also provided, the cooling device including a cooling bath having an associated belt conveyor with a first collecting belt portion inclined at an acute angle to the horizontal and extending through the level of the cooling bath for collecting chunks of solidified material.

25 Claims, 14 Drawing Sheets

(51) Int. Cl.
    *B29C 47/08*         (2006.01)
    *B29C 47/88*         (2006.01)
    *B29B 9/06*          (2006.01)
    *B29C 47/34*         (2006.01)

(52) U.S. Cl.
    CPC ............ *B29B 9/06* (2013.01); *B29C 47/0816* (2013.01); *B29C 47/0872* (2013.01); *B29C 47/34* (2013.01); *B29C 47/884* (2013.01); *B29C 2793/0027* (2013.01); *B29C 2947/92704* (2013.01); *B29C 2947/92923* (2013.01); *B29C 2947/92971* (2013.01); *Y02P 70/263* (2015.11); *Y02W 30/62* (2015.05)

(56) References Cited

U.S. PATENT DOCUMENTS

| | | | |
|---|---|---|---|
| 5,171,499 A * | 12/1992 | Cehelnik | B29C 47/003 156/244.18 |
| 5,649,785 A * | 7/1997 | Djerf | B03B 4/00 209/479 |
| 5,876,646 A | 3/1999 | Yoshida et al. | |
| 6,019,916 A | 2/2000 | Mizuguchi et al. | |
| 6,787,073 B1 * | 9/2004 | Tadler | B29B 9/06 264/13 |
| 2006/0054726 A1 | 3/2006 | Lippert et al. | |
| 2013/0224321 A1 | 8/2013 | Eloo et al. | |

FOREIGN PATENT DOCUMENTS

| | | |
|---|---|---|
| DE | 44 41 660 | 5/1996 |
| DE | 197 54 863 | 6/1998 |
| DE | 696 21 101 | 9/2002 |
| DE | 101 47 159 | 4/2003 |
| DE | 102 04 244 | 4/2003 |
| DE | 10 2005 007 102 | 8/2006 |
| DE | 10 2005 053 376 | 5/2007 |
| DE | 20 2009 011 114 | 12/2010 |
| EP | 0 432 427 | 6/1991 |
| EP | 0 774 332 | 5/1997 |
| EP | 1 970 180 | 9/2008 |
| JP | 02020308 | 1/1990 |
| JP | H0220308 | 1/1990 |
| WO | WO 01/10620 | 2/2001 |

\* cited by examiner ically disadvantageous is the use of such a hold-up tank, since on the one hand problems with the residues remaining in the hold-up tank can occur, and on the other hand considerable handling effort is required, if the hold-up tank is to be emptied.

MELT PROCESSING PLANT

This is a national stage of PCT/EP12/002687 filed Jun. 26, 2012 and Published in German, which has a priority of German no. 20 2011 104 968.3 filed Aug. 25, 2011, hereby incorporated by reference.

BACKGROUND OF THE INVENTION

1. Field of the Invention

The present invention relates to a melt processing plant, comprising a melt charger for charging a processing head, in particular palletizing head, with melt, wherein upstream of the processing head a diverter valve for discharging the melt during a starting and/or retooling phase is associated to the melt charger, and to a method for melt processing in such melt processing plant.

2. Description of the Related Art

Such melt processing plants can be configured differently and in particular be formed as pelletizing plants for example in the form of underwater pelletizing plants, wherein depending on the application different materials can be processed as melt, for example thermoplastics, polymer compounds and mixtures with and without additives, such as in the form of expandable polymers mixed with propellant, melt compounds mixed with fibers or other materials processable in the melt condition, in particular plastic melts. As an alternative to such pelletizing plants, the melt processing plant can, however, also be formed as pipe extrusion plant or blown film plant, in which a corresponding extrusion head or a film blowing head is provided as processing head. Depending on the application, said processing head of the melt processing plant also can comprise another forming tool, by means of which the melt is formed or molded in the desired way.

Such melt processing plants usually are operated with a diverter valve, so that when starting the plant, retooling the plant for example to another palletizing head or processing head, changing the melt for example from a colored melt to a non-colored melt, or in an other change-over operation, in which the plant cannot be run in the stationary operating condition or in the set operating point, the melt delivered by the melt charger can be discharged past the at least one processing head. Such processing heads like underwater pelletizing heads are relatively sensitive when they are charged with melt deviating too much from the target state, for example too cold melt or as a result too viscous melt, which for example can lead to a clogging of the die plate. The diverter valve usually is arranged in the conveying path from the melt charger, for example an extruder, and the processing head, wherein in addition to a feed or supply outlet, which is connectable with the processing head, the diverter valve comprises at least one discharge outlet which discharges the melt past the processing head. Via such discharge outlet, which can open into the surroundings and/or leads away or branches off from the proper process route of the melt processing plant or the connection between melt charger and a processing head, material or melt material not suitable for the further processing in a processing head of the melt processing plant can be kept away from the processing head and can be discarded, so to speak, wherein that the melt to be separated in this way may be treated as scrap material, for example because the melt does not yet have the correct temperature and/or still contains unmolten pieces and/or contains color impurities and/or the processing in the pelletizing or processing head has adverse properties. The inlet channel of the diverter valve connectable with the melt charger can selectively be connected with the feed channel or with the discharge channel by an adjustable switch for example in the form of a rotary vane or the like. Such diverter valve is known for example from the document EP 1 970 180. A generic diverter valve furthermore can also assume a distribution function or serve as distributor valve, in particular be connectable with a plurality of processing heads via a plurality of processing outlets, so as to be able to supply melt guided through the diverter valve to various processing heads, in order to be able to each properly process the melt.

The melt discharged from such diverter valve sometimes is simply drained to the ground, where depending on the duration of the starting operation the melt spreads to form more or less large plates or lumps, which after solidification must be removed from the ground and be comminuted, which naturally is very expensive. As an alternative to simply draining to the ground, it is sometimes also provided to put collecting tanks or tanks in the form of traveling chutes below the discharge valve, which then, as soon as they are filled, are moved away and replaced by a new, empty tank. Moving away the tanks with usually still liquid melt is very dangerous in terms of safety, since melt may spill out of the tank. On the other hand, handling problems arise after cooling and solidification of the melt, since very large blocks are obtained, which first must be removed from the tank and then be chopped into handleable pieces, so that the same can be recycled.

SUMMARY OF THE INVENTION

It is the object underlying the present invention to create an improved melt processing plant and an improved method as mentioned above, which avoids the disadvantages of the prior art and develops the latter in an advantageous way. In particular, the handling and recycling of the melt discharged as scrap from the diverter valve should be simplified and be improved in terms of safety.

It is proposed to portion the melt discharged as scrap from the diverter valve into handy pieces yet before solidification or complete curing and then quickly cool the same to such an extent that they solidify at least on the outside to such an extent that the material pieces are easy to handle. Due to portioning and subsequent cooling, the laborious chopping of large solidified chunks of material can be omitted and transporting large amounts of melt can be omitted, which is problematic in terms of work. In accordance with the invention, a portioning device for portioning the discharged melt into melt portions is associated to the diverter valve, wherein a cooling device for cooling the melt portions to at least partly solidified chunks of material is provided. Due to the portioning device disposed subsequent to the scrap or discharge channel of the diverter valve, the forerun of the melt or the melt discharged as scrap can be split up into more less small pieces which are quickly solidified by the cooling device to such an extent that they are easy to handle and advantageously can be recycled without further aftertreatment, for example in that they are again molten or extruded and are again supplied from the melt charger to the processing head or are again discharged from the diverter valve.

In principle, the portioning device can be formed in various ways. It is conceivable, for example, to first collect the melt strand emerging from the diverter valve in a hold-up tank and only then portion the same. Advantageously, however, the portioning device comprises a splitter which splits the melt strand emerging from the diverter valve into melt portions of preferably about equal size. Splitting the melt strand in particular can be performed while emerging from the diverter valve, in particular directly in the orifice region of the bypass channel of the diverter valve or just downstream thereof, but in any case splitting advantageously is effected before the emerging melt strand impinges on the ground or a base. The further handling of the split melt portions thereby is simplified considerably, since the melt or material pieces already substantially have the desired shape when impinging on a base or when immersing into a collecting medium and splitting is not made difficult by a necessary detachment or separation from another material.

In accordance with a development of the invention said splitter can comprise a splitter head with a plurality of melt channels, which can be brought in flow connection with the discharge opening of the diverter valve, and shut-off means for cyclically shutting off and clearing the melt channels and/or separating means for cyclically separating the melt strands flowing through the melt channels. By providing a plurality of melt channels in the splitter head, advantageously at least one melt channel always can at least partly be kept open, whereby a continuous discharge of the melt from the diverter valve becomes possible and pressure fluctuations due to cyclic impoundment are avoided. If one of the melt channels has just been shut off or is impaired in its outlet cross-section by the separating means, the melt can flow off via another melt channel, so that on the whole a continuous discharge from the diverter valve can be realized. Portioning occurs due to the cyclic shut-off or the cyclic separation of the melt strand, since always only a defined melt volume can exit from the respective melt channel, before the further exit is inhibited or the succeeding stream of material is separated.

To ensure a continuous discharge of the melt from the diverter valve, a control means can be provided in accordance with a development of the invention for controlling the shut-off means and/or for controlling the separating means, wherein said control means can control the shut-off means and/or the separating means such that at least always one melt channel is at least partly opened. In particular, the controller can be designed such that the melt channels are shut off and cleared in alternation or the melt strands from different melt channels are separated in alternation, such that when or after opening a melt channel, at least one other melt channel is closed and/or when separating the melt strand from a melt channel, the melt strand emerging from another melt channel temporarily can exit unimpededly.

The splitter head can be associated to the shut-off valve in different ways. According to an advantageous embodiment of the invention, the splitter head can be arranged and movably mounted relative to the shut-off valve downstream of the orifice region of the discharge channel of the diverter valve, advantageously directly adjoin the orifice region, advantageously such that depending on the position of the splitter head a respective other melt channel can be brought in flow connection with the discharge opening of the diverter valve. In such an embodiment, a shut-off of one or more melt channels of the splitter head can be achieved by shifting or moving the distributor head relative to the diverter valve. The shut-off means here are formed by the interface between diverter valve and distributor head, wherein a respective melt channel of the distributor head is cleared when if is at least partly brought in alignment with the discharge channel of the diverter valve, whereas the melt channel is shut off when it is brought out of alignment with the discharge channel of the diverter valve. The distributor head need not necessarily be directly brought in connection with the discharge opening of the diverter valve. Advantageously, there can also be provided an intermediate piece which is firmly connected with the diverter valve and comprises a distributor channel communicating with its outlet channel, which then can be brought in flow connection or out of flow connection with the melt channels provided in the distributor head by moving the distributor head as mentioned above. In this way, the splitter can be formed as an independent assembly, in which the interfaces to the movable splitter head are not specified by the diverter valve, but can suitably be adapted by said intermediate or adapter piece. Advantageously, the diameter of the discharge channel also can suitably be adapted by said intermediate piece. In particular, the connecting channel in said connecting piece can provide a nozzle-shaped formation and/or a cross-sectional taper of the melt channel provided towards the outlet, whereby shutting off or separating the melt strand can be facilitated.

Alternatively or in addition, the distributor head can be integrated into the diverter valve, in particular such that the diverter valve comprises two or more than two discharge channels which selectively, in particular alternatively, can be brought in flow connection and out of flow connection with the inlet channel of the diverter valve by shifting the valve body or the distributor switch of the diverter valve. For example, the diverter valve can comprise an inlet channel connectable with the melt charger, at least one feed channel connectable with the processing head and at least two discharge channels, wherein by at least one valve body for example in the form of a valve slide and/or a rotary vane the inlet channel selectively can be switched through to the feed channel or one of the two discharge channels. Advantageously, there can be provided a common movable valve body, which jointly accomplishes the opening or shut-off of the various channels. By cyclically reciprocating the valve body between a position in which the inlet channel is switched through to the first discharge channel and a second position in which the inlet channel is switched through to the second discharge channel, portioning of the melt discharged from the diverter valve can be accomplished. Advantageously, the size of the melt portions can be controlled by the speed or frequency with which the valve body is reciprocated.

As an alternative to such formation integrated into the diverter valve, said splitter head also can form a separate assembly, which on the outlet side is put onto the discharge opening or discharge openings of the diverter valve.

If said splitter head is movably arranged relative to the diverter valve in the aforementioned manner, the splitter head advantageously can be part of a cart or carriage which can reciprocably be driven by a carriage drive. The carriage in particular can be reciprocated such that in alternation another of the plurality of melt channels of the splitter head can each be brought in flow connection with a discharge opening of the diverter valve, while at least one other melt channel of the splitter head is each brought out of flow connection with the discharge opening of the diverter valve. In principle, the driving device for such reciprocatingly movable carriage can be formed in different ways, for example operate hydraulically, pneumatically, electrically or mechanically or by a combination thereof or in some other way actuated with external energy. According to an advantageous embodiment of the invention, for example a pressure medium cylinder can be provided, by means of which the splitter head can be reciprocated along a predetermined linear path of movement, wherein said path of movement in particular can be straight, but possibly also be arcuately curved.

Alternatively or in addition to such carriage solution, the splitter head can also be rotatably mounted and be driven rotatorily, preferably continuously, by a rotary drive. The splitter head can be formed in the manner of a turret head which includes a plurality of melt channels on a common pitch circle around the axis of rotation and is arranged relative to the diverter valve such that the orifice of the discharge channel of the diverter valve lies on said pitch circle, so that by rotating the distributor head various melt channels one after the other can be brought in flow connection with the discharge channel of the diverter valve.

The rotary drive likewise can be formed differently, for example operate hydraulically, pneumatically, electrically or in a combination of said possibilities, for example comprise a rotator which is mechanically connected with the rotatable splitter head via belts, gear wheels or in some other way by a transmission.

Instead of a movably mounted splitter head, a splitter head rigidly connected with the diverter valve can also be provided, wherein advantageously such rigidly arranged splitter head comprises a plurality of melt channels to which shut-off means and/or separating means are associated, so that selectively at least one melt channel each can be shut off in alternation or at least one melt strand emerging from the melt channel can be separated, while at least one other melt channel can be cleared or at least one melt strand can exit from another melt channel.

In a rigidly arranged splitter head the shut-off means and/or the separating means advantageously are movably mounted relative to the splitter head, wherein in a movably mounted splitter head such movable shut-off means or separating means can of course also be provided. The shut-off means or the separating means can perform their function by moving relative to the splitter head or can be switched between their different operating conditions, and the shut-off means in particular can be moved relative to the splitter head between their shutting and their clearing position or the separating means can separate the respective melt strand or divide the same into pieces by moving relative to the splitter head.

In principle, the drive means associated to the shut-off means and/or separating means can be formed in different ways, in particular operate hydraulically, pneumatically, electrically, mechanically or in a combination thereof. The shut-off means or the separating means can be mounted in a linearly movable manner, wherein in this case a linear drive can be provided. Alternatively, the shut-off means and/or the separating means can, however, also be rotatably mounted, wherein in this case a rotary drive is provided for shifting the shut-off means or the separating means relative to the splitter head.

In an advantageous development of the invention the size of the melt portions can variably be controlled by varying the speed of movement or the movement frequency of the splitter head relative to the diverter valve and/or by varying the speed of movement or movement frequency of the shut-off means or separating means relative to the splitter head. When the speed of movement or movement frequency is increased, smaller melt portions can be achieved, whereas larger melt portions can be achieved by slowing down said speed of movement or movement frequency.

In an advantageous development of the invention, said speed of movement and/or movement frequency of the splitter head and/or of the shut-off means or separating means associated to the distributor head can automatically or semi-automatically be controlled by a control device, in particular in dependence on a detected melt portion size, a melt portion weight or a melt portion volume and/or in dependence on a melt mass flow which is discharged. In particular, the speed of movement or movement frequency can be increased, when the melt portions become too large and/or when the melt feed stream increases. For this purpose, the size of the portioned melt pieces can be detected, for example by particle size determination carried out optically or in some other way. Alternatively or in addition, the melt mass flow can be determined, which is provided by the melt charger and/or discharged by the diverter valve.

In a development of the invention, the aforementioned shut-off and/or separating means can include a cutting and/or shearing tool for cutting or shearing off the melt strand emerging from a melt channel of the splitter head, wherein in an advantageous development of the invention said cutting and/or shearing tool is movable through the melt strand to be separated transversely to the longitudinal direction of the melt channel. In an advantageous development of the invention, said cutting or shearing tool can be moved directly above the exit opening of the respective melt channel of the distributor head, in particular such that the cutting or shearing tool slides along on the edge regions of the orifice opening.

In an advantageous development of the invention, the splitter head can possess a flat orifice surface, on which the melt channels open and on which said cutting and/or shearing tool can move along.

In an advantageous development of the invention, said shut-off and/or separating means can comprise a shut-off and/or separating plate, which can be moved along over the orifices of the melt channels of the splitter head, advantageously in the form of a reciprocating, linearly movable slide or in the form of a rotatable rotary plate whose axis of rotation advantageously is substantially vertical to the orifice cross-section of the melt channels. Advantageously, the orifice regions of the melt channels of the splitter head can lie in a common plane, wherein advantageously said plate is movable parallel to this orifice plane, either linearly and/or rotatorily. In particular, the splitter head can possess a flat orifice surface on which the melt channels open and on which said plate can be moved along the shut-off or separating means.

Said plate can be formed and moved such that depending on the position of the plate relative to the splitter head a respective melt channel orifice is cleared or closed.

In particular, said plate can form a cutting and/or shear plate which comprises at least one passage recess which can at least partly be brought in alignment with the orifices of the melt channels of the splitter head, wherein an edge portion defining said passage recess forms a cutting and/or shearing edge which on moving through an emerging melt strand cuts or shears off the same. The orifice of a melt channel, which—depending on the relative position of cutting or shear plate and splitter head—is not in alignment with a passage recess of said cutting or shear plate, is blocked by said plate, so that in this moment or period no melt can exit. By alternately bringing the at least one passage recess info the position in alignment or not in alignment with the respective melt channel, the melt strand emerging there is portioned.

Said cutting or shear plate in particular can be formed in the form of a die plate or a valve plate, which by moving selectively dears at least one melt channel of the splitter head and shuts off another melt channel, wherein by moving said die plate or valve plate another melt channel each is cleared and in turn another melt channel is closed in alternation to each other.

In principle, the cooling device for cooling the portioned melt volumes can be formed in different ways and can comprise various cooling devices connected in series or in parallel.

In accordance with a development of the invention, said cooling device can already cool the melt strand emerging from the diverter valve, while the melt strand is divided into portions by the portioning device. Alternatively or in addition, cooling can start already shortly before portioning and/or be performed shortly after portioning. In principle, the cooling means provided in the orifice region of the diverter valve and/or in the region of the portioning device can be formed in different ways, wherein said cooling means in particular can comprise an air and/or gas cooler for charging the melt with cooling air and/or cooling gas, for example in the form of a cooling air blower and/or a cooling air suction device. Alternatively or in addition, the cooling means can comprise a liquid cooler for charging the melt with a cooling liquid, advantageously in the form of a liquid sprayer, which comprises at least one spray nozzle which can be directed onto the melt strand emerging from the diverter valve. Alternatively or in addition, said cooling means also can comprise a contact cooler which comprises a cooling surface contacted by the emerging melt strand. In particular, said contact cooler can be integrated into the orifice region of the diverter valve and/or into the aforementioned splitter head, in particular into its orifice region, in order to cool the orifice regions of the corresponding melt channels.

Alternatively or in addition to cooling the melt on portioning, the cooling device also can cool the melt pieces portioned already, which possibly can already be solidified at least in part. In particular, downstream of the portioning device a cooling bath can be provided, into which the portioned melt pieces are immersed, in order to release heat to the cooling liquid and thereby cool down. By such cooling bath, heat can be withdrawn from the portioned melt pieces particularly efficiently due to the liquid contact.

In an advantageous development of the invention, said cooling bath is arranged below the portioning device and is reachable by the melt portions by gravity. Correspondingly, a transport device actuated by external energy can be omitted between portioning device and cooling bath. In particular, the cooling bath can be arranged substantially vertically below the portioning device, so that the melt portions can fall into the cooling bath in free fall. Possibly, the melt portions can also be passed into the melt bath via a chute, wherein said chute can have a more or less acute-angled inclination to the vertical.

Depending on the volume and the cooling liquid used, the cooling bath can maintain the necessary temperature without special cooling means. Possibly the cooling bath can be formed with two circuits, wherein a secondary cooling circuit with a heat exchanger arranged outside the cooling bath and/or a heat exchanger arranged within the cooling bath for cooling the primary cooling liquid can be associated to the cooling bath. If an underwater pelletizer is used, the water circuit of the pelletizer can be used for cooling the cooling bath.

In principle, the heat withdrawn from the melt portions or chunks of material might simply be removed by dissipation, for example by a corresponding heat exchange with the ambient air. In an advantageous development of the invention, however, the heat to be withdrawn from the melt portions or chunks of material can be recovered and selectively be used at another point of the processing plant or the facilities equipment, at which heat is required or heating is necessary. For this purpose, a heat recovery means can be associated to the cooling device, which selectively recovers and stores the heat obtained on cooling and/or uses the same at a plant and/or building part to be heated or transfers the heat to said plant or building part.

In principle, the heat recovery can be effected at various points and be associated to various cooling means of the cooling device. In particular, the recovery can be effected in the region of the at least one cooling bath, to which at least one heat exchanger can be associated in the primary and/or secondary circuit, via which the heat is recovered. Alternatively or in addition, a heat recovery can also be effected via a corresponding heat exchanger in the region of the pre-cooling, for example the aforementioned contact cooler, with which the melt strand to be portioned is cooled in the region of the diverter valve and/or the portioning device.

The heat recovered can be used for example for preheating the drying air, which for example is used by means of a blower, in a downstream drying station in which the cooled and solidified chunks of material are to be dried. If an underwater pelletizer is used, the recovered heat can alternatively or additionally be used for preheating the water circuit of the underwater pelletizer. Alternatively or in addition, the processing head of the melt processing plant can be heated by the recovered heat. Alternatively or in addition to heating such processing plant components, the recovered heat can however also be used for example to heat the factory hall or to support the heating of buildings.

To facilitate and/or automate the further handling of the chunks of material solidified and cooled in the cooling bath, a removal conveyor is provided in accordance with a development of the invention for removing the chunks of plastic material from the cooling bath. In principle, said removal conveyor can be formed in different ways, for example comprise at least one collecting sieve formed and drivable in the manner of a fishing net, which can be immersed into the cooling bath and skim off the chunks of material present there. In accordance with a development of the invention, in particular a belt conveyor can however advantageously be provided, with which the chunks of material present in the cooling bath are removed from the cooling bath.

In accordance with a development of the invention, the belt conveyor can comprise a collecting belt portion inclined at an acute angle to the horizontal and extending through the level of the cooling bath, which collects and removes chunks of material floating on the cooling bath. Advantageously, the removal conveyor or a separate function module can comprise circulating means associated to the cooling bath, in order to circulate the cooling bath and due to the circulation bring chunks floating on the water onto the conveyor. In particular, the circulating means can be formed such that a flow moving towards the collecting belt portion is generated. Said circulating means for example can comprise revolving blades or the like, which for example can be connected with a deflection pulley or a deflection roller of the belt conveyor.

To be able to also remove sinking chunks of material, the belt conveyor alternatively or in addition to said collecting belt portion obliquely extending through the level can comprise a collecting portion arranged at the bottom of the cooling basin, which substantially is arranged horizontally or only slightly inclined to the horizontal, in particular covers the bottom of the cooling basin, so that sinking chunks of material necessarily get onto said collecting belt portion.

To carry along the chunks of material to be collected despite the resistance of water, the belt conveyor can comprise carriers mounted on the revolving conveying means, for example in the form of protrusions which protrude upwards from the top strand. Advantageously, such carriers for example can be formed in the form of a rake or in the form of a perforated flight, so as not to exert too strong a circulating effect onto the liquid bath.

In accordance with a development of the invention, the revolving means of the belt conveyor is formed liquid-permeable or not liquid-retaining. In particular, the revolving conveying means can comprise recesses through which water initially standing on the conveying means can flow off. For example, a perforated conveyor belt can be provided, for example in the form of a textile belt. Alternatively or in addition, a strip-type belt conveyor can be provided, in which the conveyor belt is formed of a plurality of straps extending one beside the other, so that the liquid can flow off through the gaps between the straps. Alternatively or in addition, the top strand of the belt conveyor also can have a slight transverse inclination and/or be curved slightly convex in cross-section, so that water standing on the conveyor belt can flow off towards the side.

To prevent the chunks of material to be carried along from laterally falling or rolling down, lateral flights can be associated to the conveyor belt, for example in the form of a railing, wherein advantageously an at least small gap is provided between the conveyor belt and the border, so as to allow liquid to flow off towards the side. The size of the gap is adapted to the chunks to be removed, so that said chunks cannot slip through.

In accordance with a development of the invention, a cooling device and/or a drying device can be associated to said removal conveyor, in order to further cool and/or dry the removed chunks of material. Possibly, such further cooling device and/or drying device can be provided after a further cooling bath, into which a first portion of the removal conveyor delivers the chunks from the first cooling bath or from a front cooling bath. To achieve an energy-efficient and thermally equally effective cooling by a plurality of cooling baths, the cooling baths arranged one after the other can have a successively lower temperature, i.e. a second cooling bath can have a lower temperature than a first cooling bath, a third cooling bath can have a lower temperature than the second cooling bath, etc.

The aforementioned further cooling device and/or drying device, which are associated to the removal conveyor after the first or a further cooling bath, can be formed differently in principle. For example, corresponding cooling means can comprise an air and/or gas cooler for charging the chunks of material conveyed by the removal conveyor with cooling air or cooling gas. Alternatively or in addition, a liquid cooler can be provided for charging the chunks of material conveyed by the removal conveyor with cooling liquid. Alternatively or in addition, a contact cooler can be provided, for example in the form of a cooled conveyor belt.

To achieve drying of the cooled chunks of material, a drying station arranged downstream of the removal conveyor can be provided, which dries the chunks of material deposited by the removal conveyor. In an advantageous development, such drying station can comprise a centrifugal drier, a cyclone separator or also a moving drier, which for example can be formed as shaker and shakes or vibrates the chunks of material, in order to mechanically shake off liquid droplets still adhering to the chunks of material.

Alternatively or in addition to such drying station arranged downstream of the removal conveyor, a continuous drier can also be provided, which is associated to a removal conveyor portion and dries the chunks of material, while the same are removed. Such continuous drier for example can comprise an air drier, for example in the form of a blower, an extractor and/or a cyclone separator. Alternatively or in addition, a radiation drier can be provided, which at least partly dries the chunks of material conveyed on the removal conveyor for example by infrared radiation. Alternatively or in addition, the continuous drier also can be formed as moving drier or include such moving drier, for example in the form of a vibrating line, which can form part of the removal conveyor. For example, a portion of the removal conveyor can be formed as vibratory or shaking conveyor.

BRIEF DESCRIPTION OF THE DRAWINGS

The invention will subsequently be explained in detail with reference to preferred exemplary embodiments and associated drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
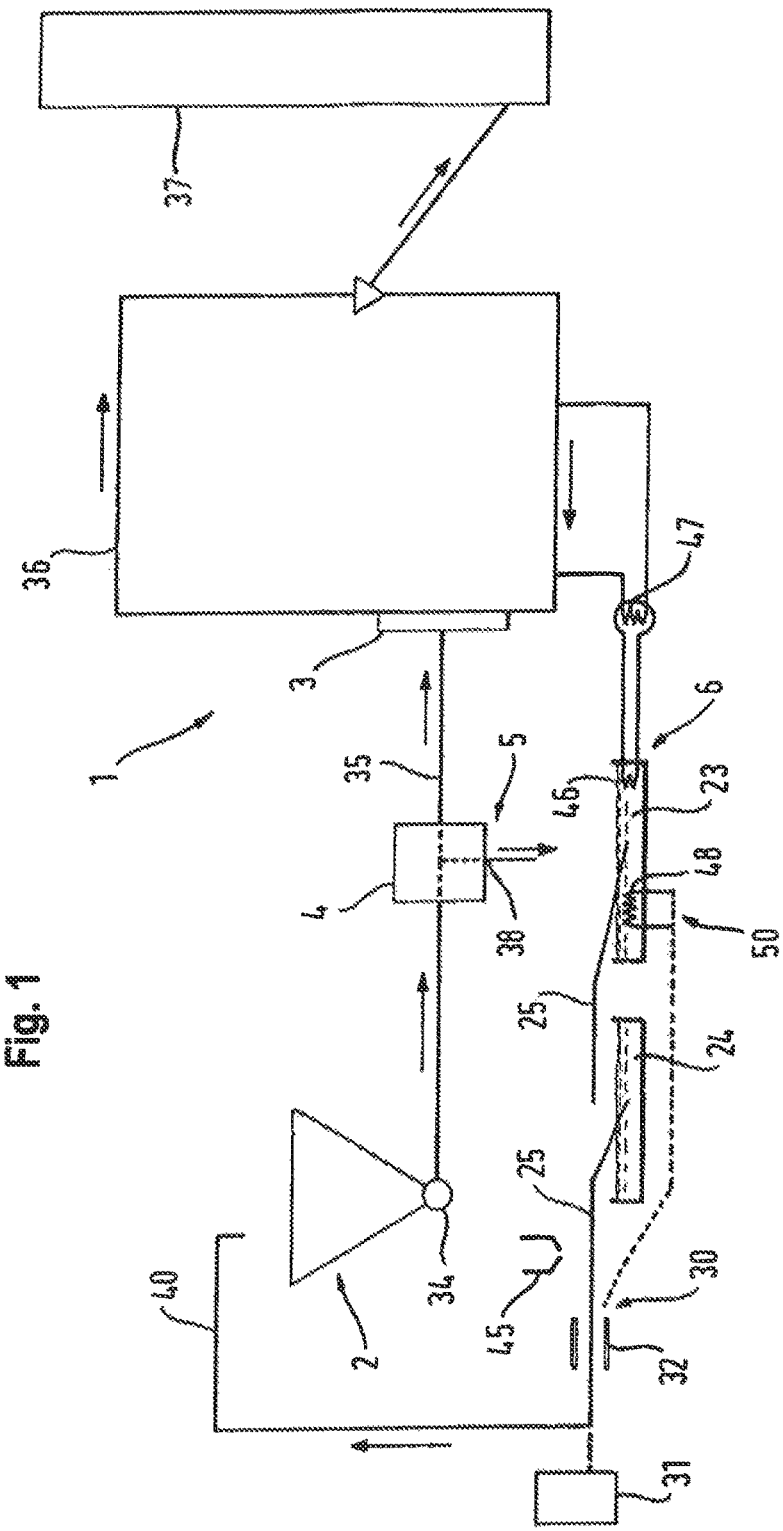
FIG. 1; shows a schematic representation of a melt processing plant in the form of an underwater pelletizing plant according to an advantageous embodiment of the invention, in which a melt charger charges an underwater pelletizing head with melt via a diverter valve by pelletizing the melt to obtain granules.

As shown in FIG. 1, a melt processing plant according to an exemplary embodiment of the invention can be formed as underwater pelletizing plant 1. A melt charger 2, which for example can comprise an extruder 34, supplies melt to a pelletizing head 3 of the underwater pelletizer via a supply channel 35, which in the pelletizing head 3 in a manner known per se is pressed through a die plate with a plurality of bores and is cut into pellets by a pelletizing knife, which pellets are carried away from the pelletizing head 3 by the water circuit 38 of the pelletizing plant 1 and can get into a drier, for example a centrifugal drier 37, in which they are dried.

To ensure that the melt can be discharged past the pelletizing head 3 when starting the process or during a retooling phase, a diverter valve 4 is provided between the melt charger 2 and the pelletizing head 3, which in the operating position switches the supply channel 35 between the melt charger 2 and the pelletizing head 3, but in the diverting or discharging or bypass position discharges the melt coming from the melt charger 2. For this purpose, the diverter valve 4 comprises at least one bypass channel with a discharge opening 38 beside at least one inlet channel and at least one feed channel, cf. FIG. 1. The diverter valve 4 also might possess a plurality of inlet channels and/or a plurality of feed channels, to possibly be able to connect a plurality of melt chargers 2 with a plurality of pelletizing heads 3 or to distribute the melt over various processing heads in the proper functional condition.

Figure 2:
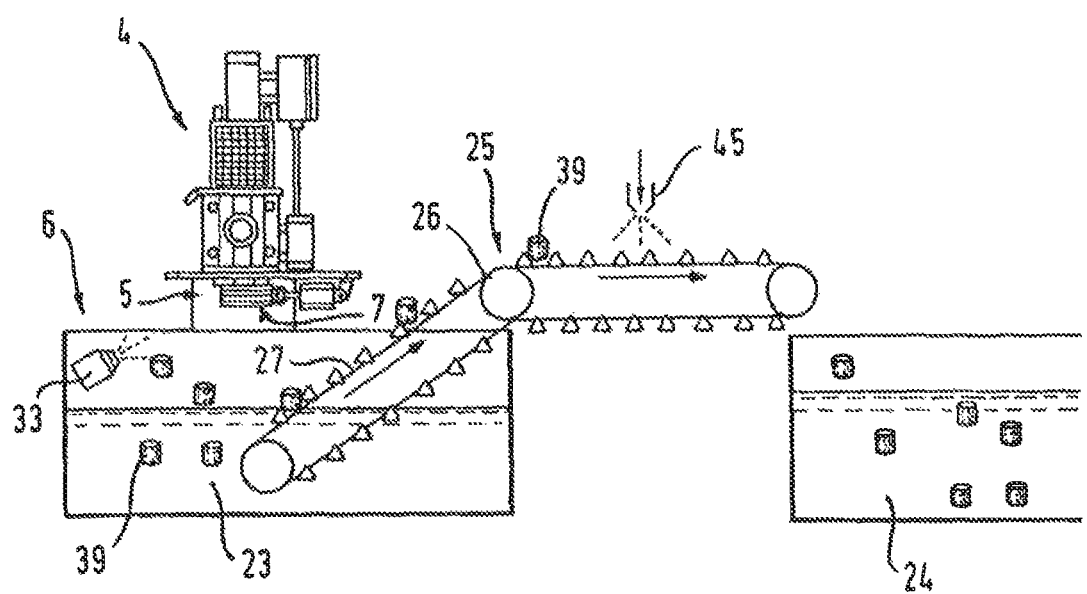
FIG. 2: shows a schematic representation of the diverter valve, the portioning means associated to the diverter valve and the cooling device associated to and arranged downstream of the portioning means for cooling the melt portions discharged from the diverter valve and portioned, and of the removal conveyor for removing the solidified chunks of material.

As shown in FIG. 2, a portioning device 5 is associated to the diverter valve, which portions the melt discharged into handy melt portions, in particular splits the melt strand emerging from the discharge opening 38 of the diverter valve 4 into melt clots of about equal size each, which by cooling then at least partly solidify and form chunks of material 39, which after further cooling and drying can again be processed in a recycling circuit 40, for example can be supplied to the melt generator. As an alternative to a direct recirculation of the chunks of material 39 into the melt generator, the chunks of material 39 can however also be recycled and be processed further in some other way. For example, they initially can also be stored temporarily, in order to then define the use depending on the future requirements. The chunks of material 39 need not again be supplied to the processing plant, from which they were discharged. Rather, the chunks of material 39 also can be supplied to other uses, for example for a pipe extrusion or other applications in which a corresponding material is required, wherein here possibly further preliminary and intermediate processing steps can be performed, for example a comminution or mixing with other substances.

According to a first embodiment which is shown in FIGS. 3-7, the portioning device 5, which is arranged at the discharge opening 38 of the diverter valve 4, can include a splitter head 8 movably mounted relative to the diverter valve 4, which is part of a carriage 14 which can linearly be moved to and fro relative to the diverter valve 4. Said splitter head 8 comprises a plurality of melt channels 9 and 10, which are formed separate from each other and have various orifice regions. With their inlet openings, the two melt channels 9 and 10 are located directly one beside the other, cf. FIG. 3, whereas the outlet regions of the melt channels 9 and 10 are spaced from each other. This is achieved by a channel routing with different inclinations, cf. FIG. 5.

By means of the carriage 14, the splitter head 8 can be reciprocated relative to the diverter valve 4 such that the two melt channels 9 and 10 move their inlet region over the discharge opening 38 of the diverter valve 4 and depending on the position of the carriage 14 at one time the one melt channel 9 and at another time the other melt channel 10 gets in flow connection with said discharge opening 38. In the process, the respectively other melt channel 9 gets out of flow connection, so that it is cut off from the melt stream discharged.

Figure 7:
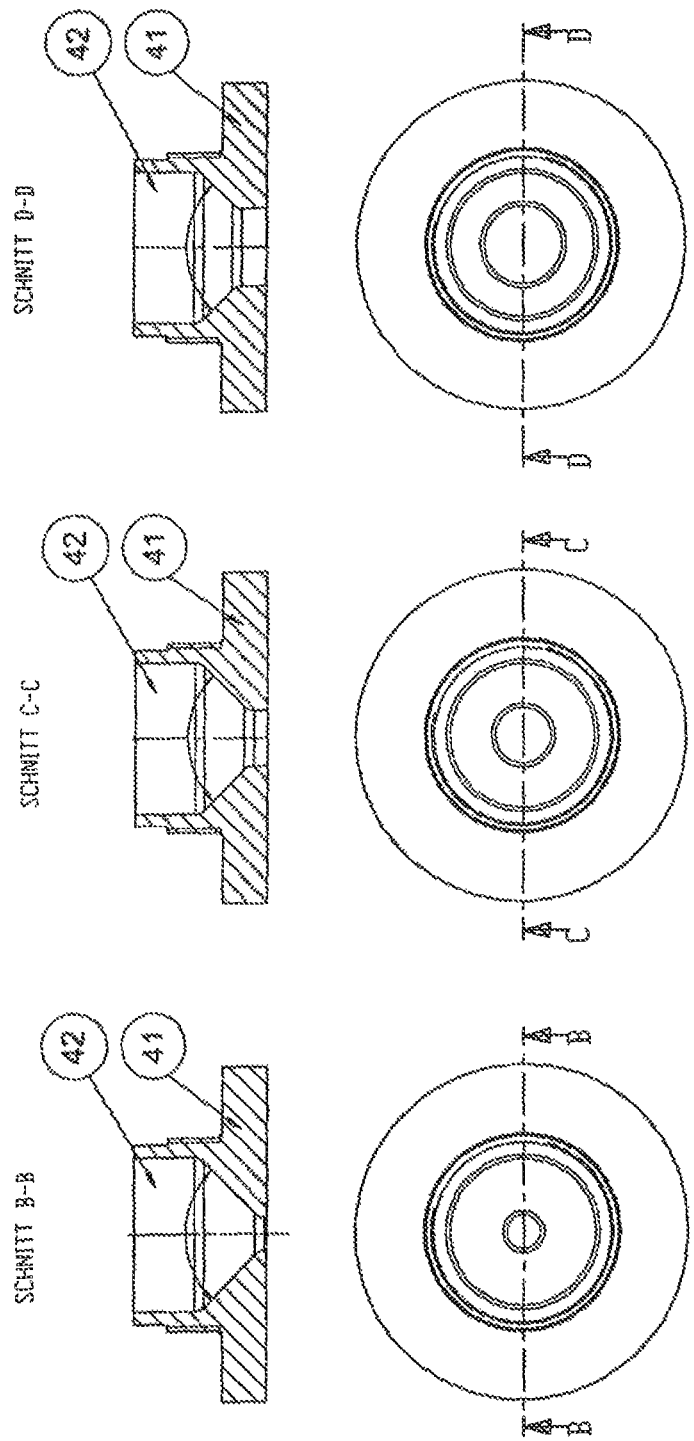

The melt channels 9 and 10 of the carriage 14 need not directly come in engagement or flow connection with the discharge opening 38 of the diverter valve 4. Advantageously, the splitter 7 can comprise an intermediate or adapter or connecting piece 41 in the form of a nozzle insert, which is stationarily mounted on the diverter valve 4 and is in flow connection with said discharge opening 38. The carriage 14 reciprocates relative to the intermediate piece 41, so that the melt channels in the splitter head 8 come in flow connection with the nozzle opening of the nozzle insert of the adapter piece 41 or get out of flow connection therewith. As shown in FIG. 7, the inlet of the splitter 7, which can be formed by said adapter piece 41, can comprise a melt inlet channel 42 which is tapered in cross-section in flow direction and tapers the outlet cross-section of the discharge opening 38 of the diverter valve 4 to a distinctly smaller diameter. As shown in FIG. 7, different cross-sectional profiles can be provided here, wherein the taper advantageously is achieved via a substantially conical channel portion which tapers an inlet region of larger cross-section to a nozzle outlet region of smaller cross-section. The flow cross-section of the adapter piece 41 in particular can be adapted to the viscosity of the melt discharged, wherein expansions in diameter eventually can also be possible. For a plurality of melts, however, a nozzle-shaped cross-sectional taper will be helpful, in particular for usual melts as they are employed in underwater pelletizers. Advantageously, the outlet cross-section of the nozzle insert can be less than 75%, preferably less than 50% and in particular about 25%-50% of the inlet cross-section, depending on the material and viscosity of the melt, cf. FIG. 7.

As shown in FIGS. 3-6, the carriage 14 can linearly shiftably be guided or mounted on a preferably plate-shaped carrier 43, wherein said carrier 43 carries or includes the aforementioned adapter piece 41 and is mountable to the diverter valve 4. For this purpose, said carrier 43 advantageously can have a mounting surface adapted to the contour of the diverter valve 4.

Figure 3:
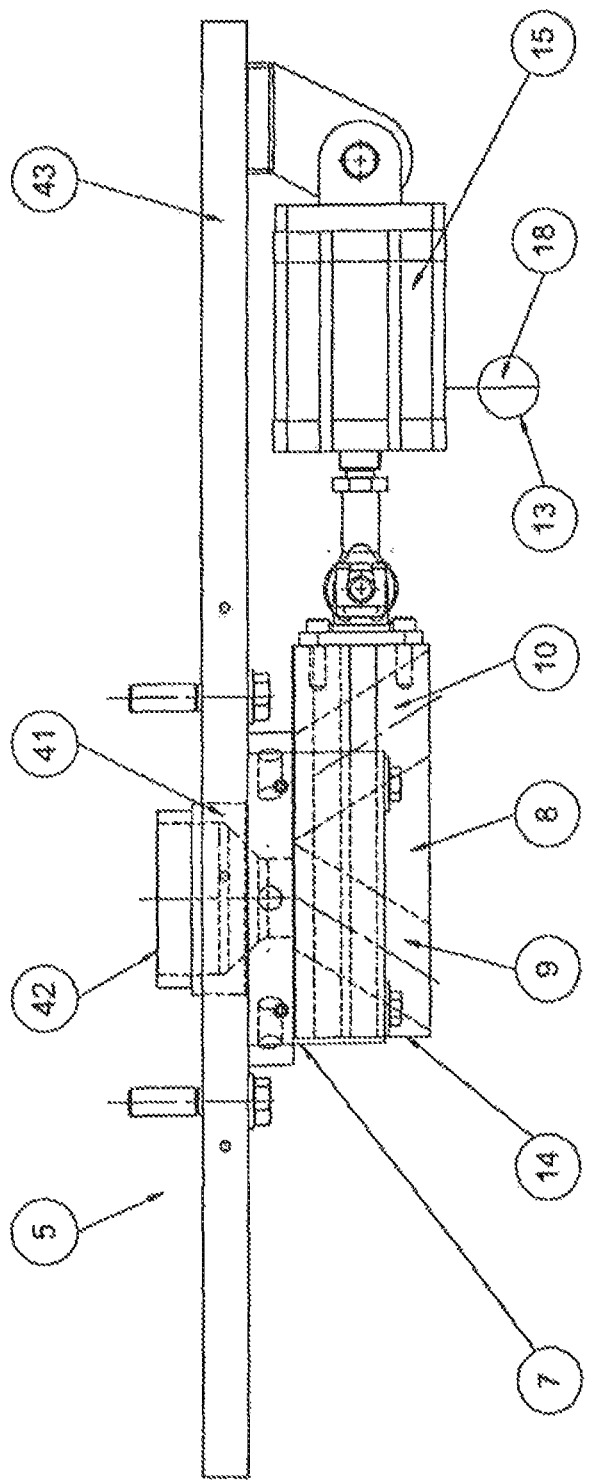
FIG. 3: shows a schematic side view of the portioning device associated to the diverter valve of FIG. 1, wherein the reciprocable carriage and the carriage drive provided for this purpose are illustrated.
Figure 4:
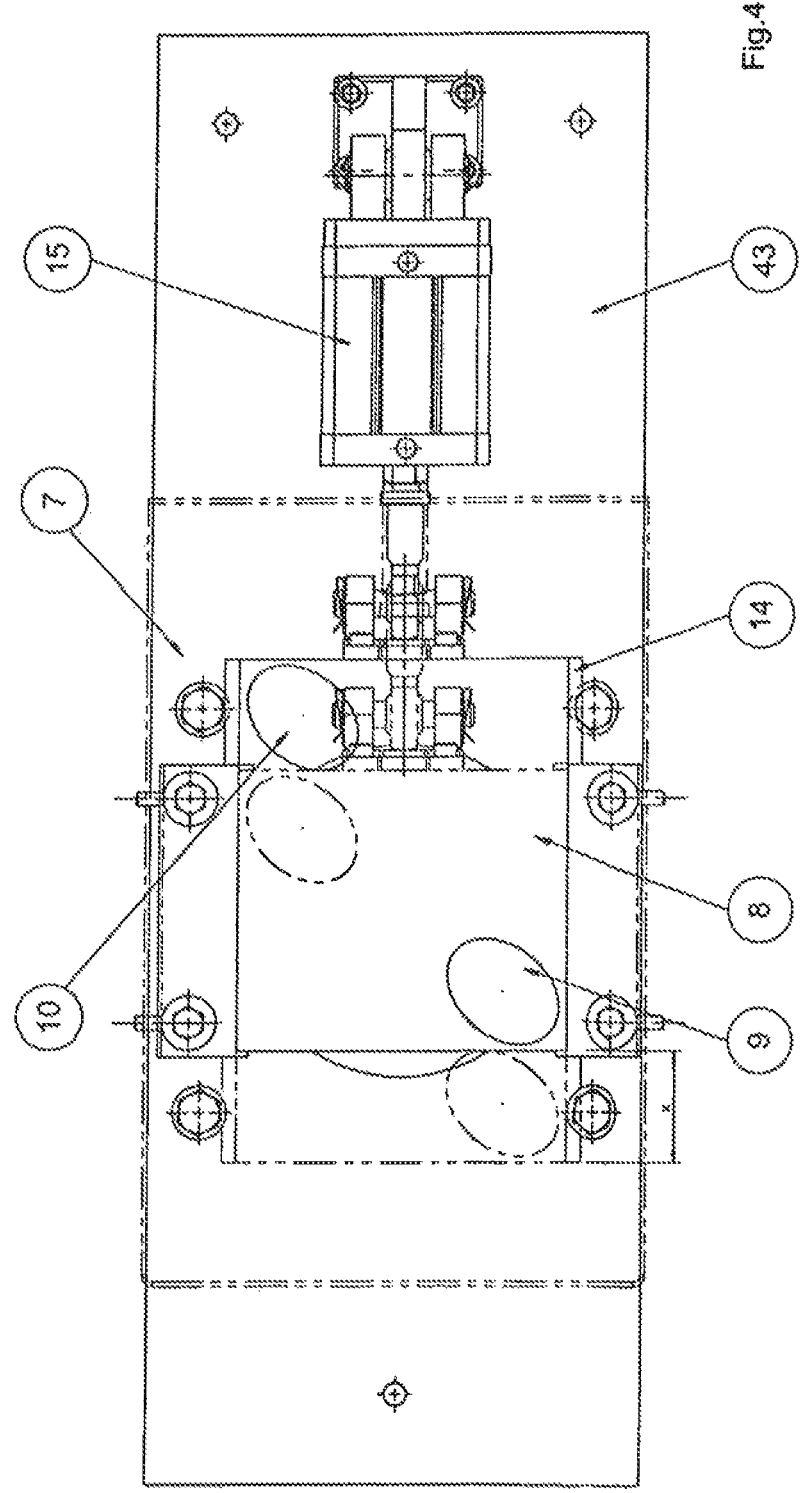
FIG. 4: shows a top view of the bottom side of the portioning device of FIG. 3, which shows the various outlets of the plurality of melt channels.
Figure 5:
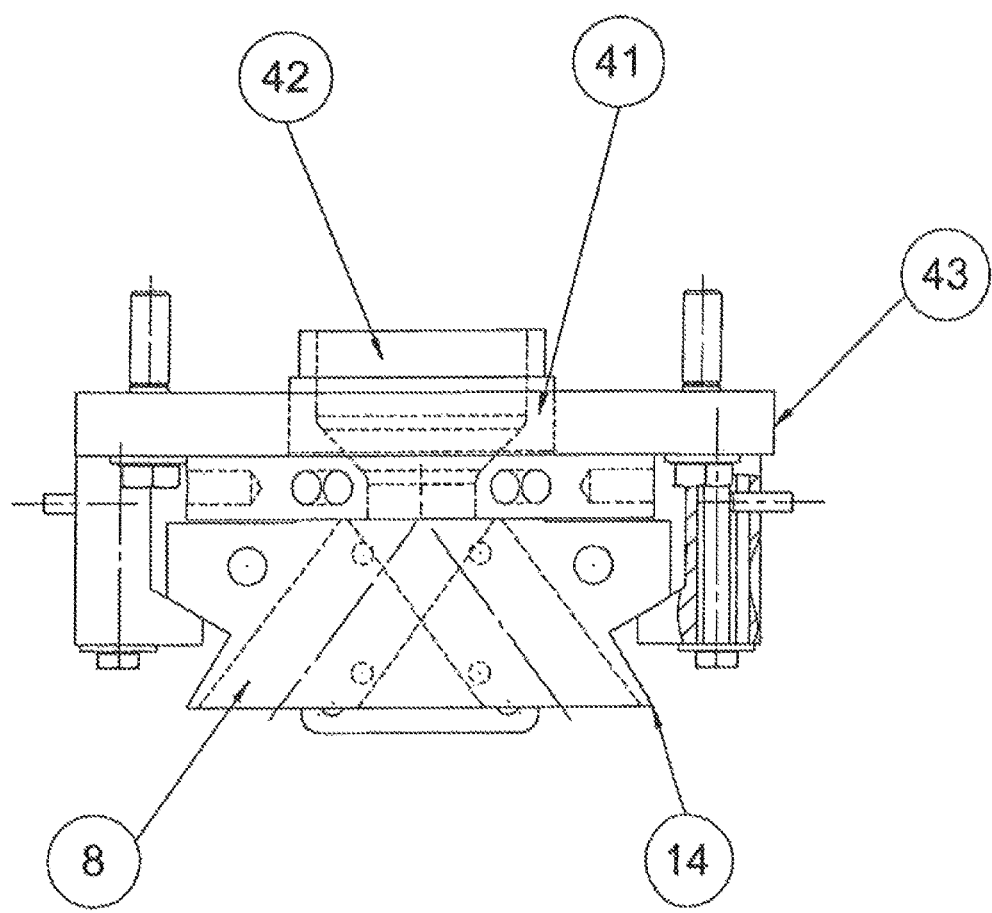
FIG. 5: shows an end view of the portioning device of FIGS. 3 and 4 in a viewing direction parallel to the direction of travel of the carriage, FIG. 6; shows a perspective exploded representation of the portioning device of FIGS. 3-5, FIG. 7: shows a sectional view of various nozzle inserts of the positioning device of FIGS. 3-6, FIG. 8: shows a side view of a portioning device associated to the diverter valve according to a further advantageous embodiment of the invention, in which a rotatorily drivable distributor head is provided, to which a stationarily arranged shear blade is associated.
Figure 6:
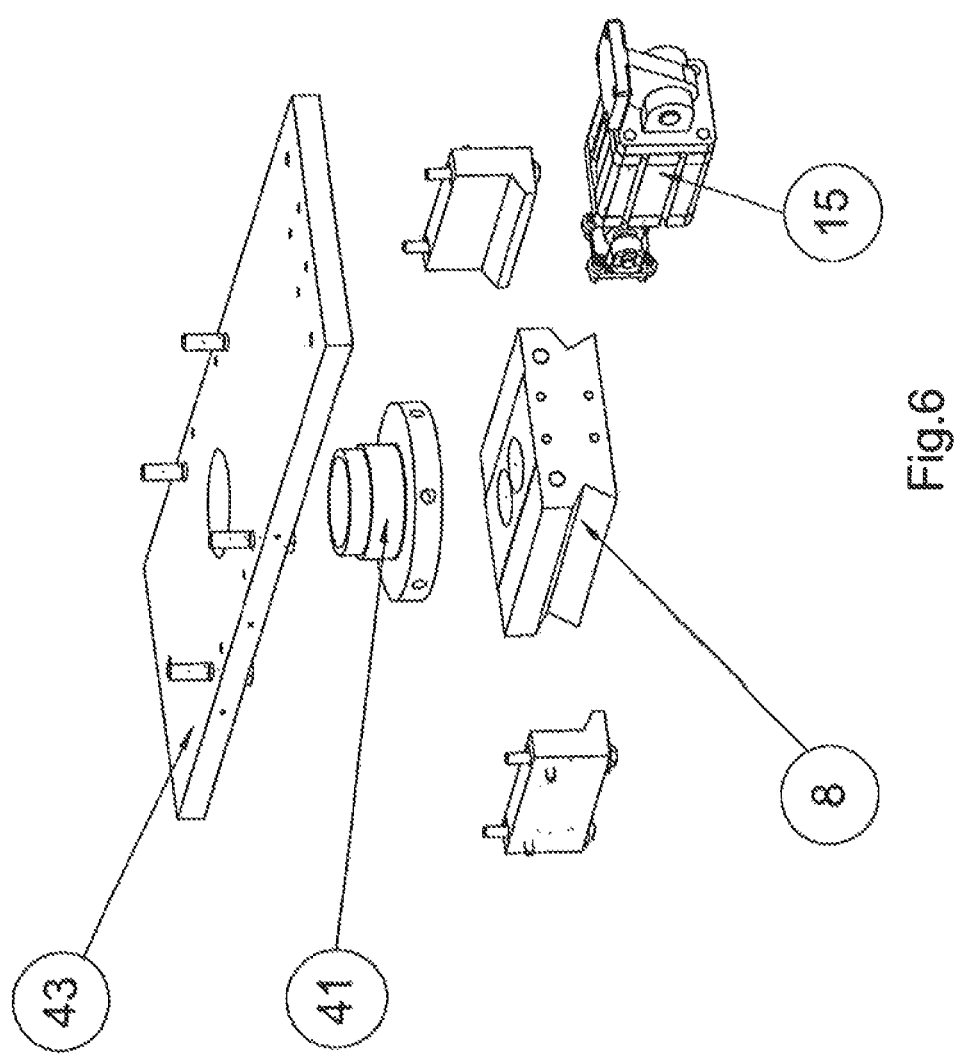

To be able to reciprocatingly drive the carriage 14, a carriage drive 15 can be provided, which in the depicted embodiment constitutes a pressure-medium cylinder, but can also be configured differently, as has been explained above. As shown in FIG. 3, the carriage drive 15 on the one hand can be connected with the carriage 14 and on the other hand be articulated to the carrier 43.

By reciprocating the carriage 14, the plurality of melt channels 9 and 10 in the splitter head 8 alternately get in flow connection with the discharge opening 38. When a melt channel is in flow connection with the discharge opening, the respective other melt channel is out of flow connection. As a result, the emerging melt strand is split into corresponding pieces. By an only schematically represented control device 13, the carriage drive 15 is actuated in the desired way, in order to achieve the splitting of the melt in the desired way. In particular, control means 18 can vary the drive speed and frequency, in order to vary the portion size or control the same in the desired way or adjust the same to a desired portion size.

Figure 8:
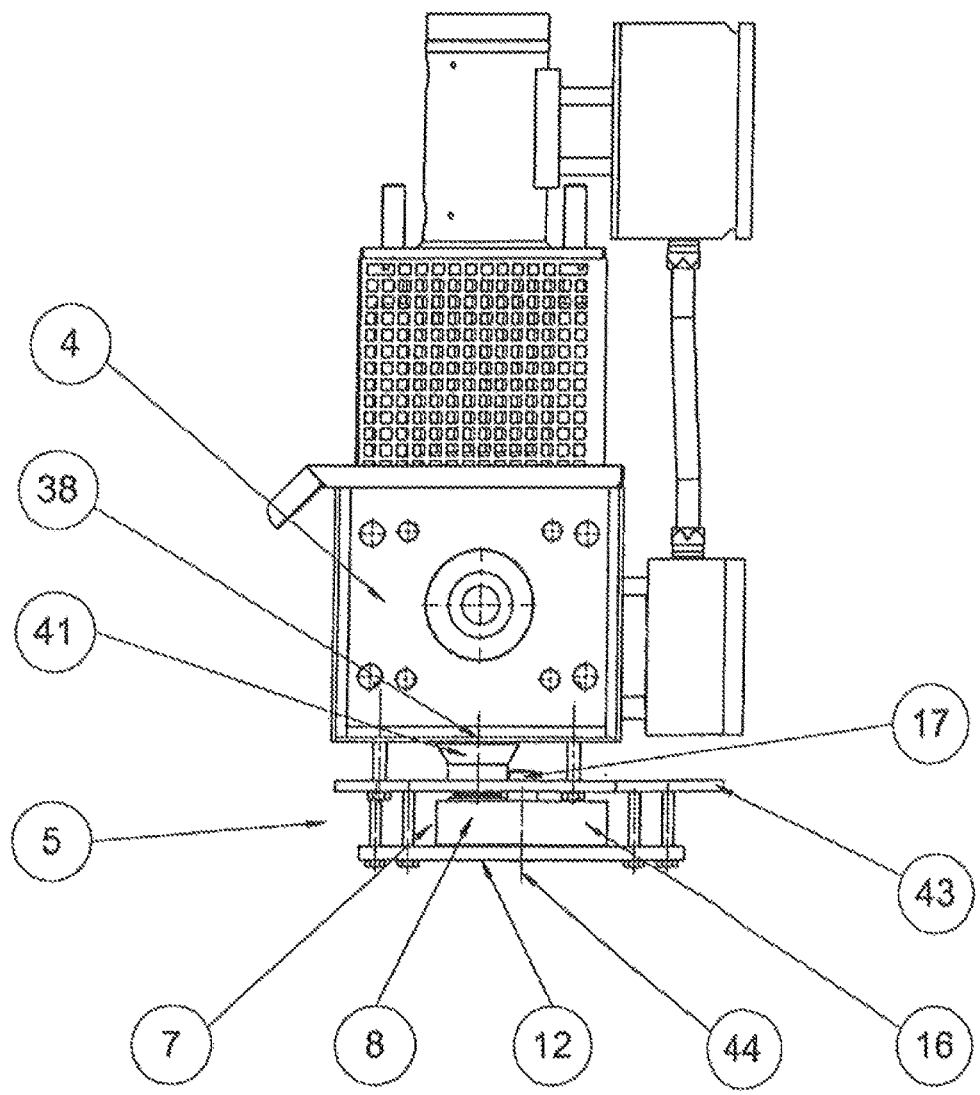
Figure 9:
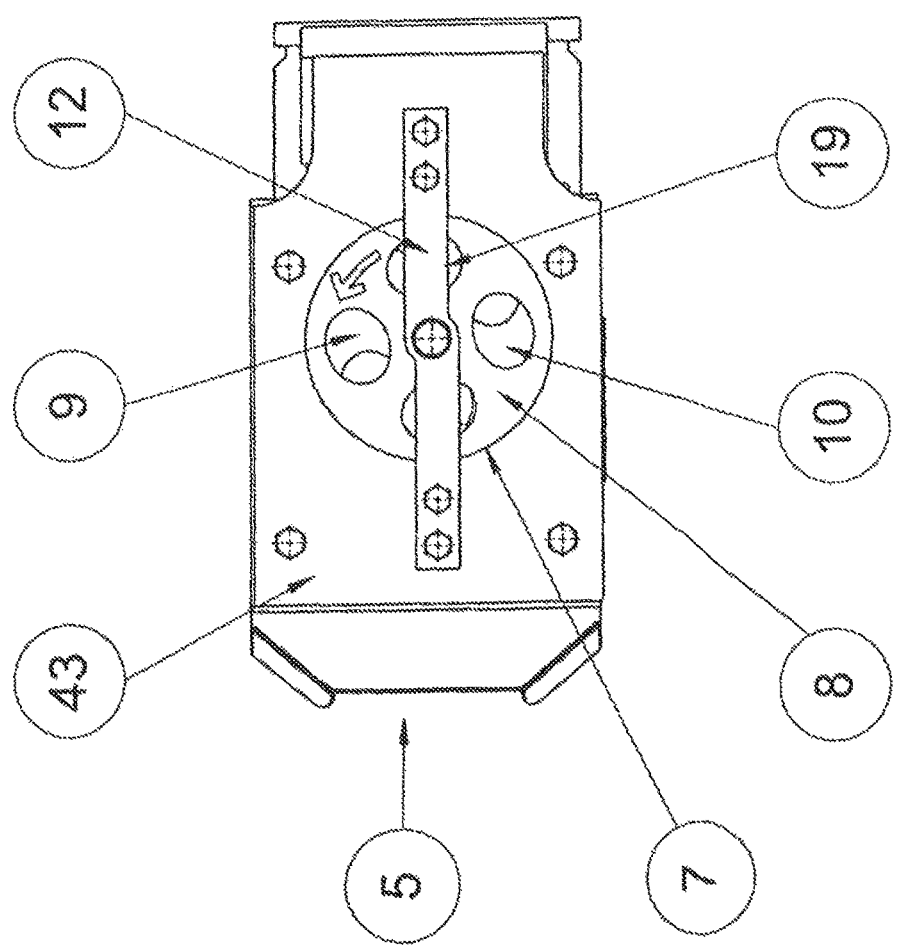
FIG. 9: shows a perspective view of the portioning device of FIG. 8, which shows the shear blade obliquely from below.

As an alternative to the carriage solution shown in FIGS. 3-7, the splitter 7 also can comprise a rotatorily movable splitter head 8, as is shown by the embodiment of FIGS. 8 and 9. The splitter head 8 can be formed substantially plate-shaped and include a plurality of through bores which form the melt channels 9 and 10, wherein the number of the melt channels can vary. Advantageously, at least two melt channels are provided here, but it is also possible to employ more than two melt channels. In the depicted embodiment, four of such melt channels are formed in the splitter head 8.

The melt channels 9 and 10 are arranged on a common pitch circle around the axis of rotation 44, so that during the rotation of the splitter head 8 they circulate on the same path of circulation. The axis of rotation 44 is substantially parallel to the longitudinal direction of the discharge channel of the diverter valve 4 and/or substantially parallel to the longitudinal direction of the nozzle opening of the intermediate piece 41. Like in the preceding embodiment, an adapter piece 41 also can advantageously be employed in the embodiment of FIGS. 8 and 9, which is rigidly mountable on the discharge opening 38 of the diverter valve 4, in particular by means of the carrier 43 explained already, on which the splitter head 8 is movably mounted.

By rotating the splitter head 8, another melt channel 9 or 10 each gets in flow connection with the nozzle opening of the intermediate piece 41 and hence with the discharge opening 38 of the diverter valve 4, whereas the respective other melt channels are cut off from the outflowing melt. In this way, a portioning of the emerging melt strand correspondingly is achieved. By varying the rotational speed of the splitter head 8 or the frequency with which the splitter head 8 is advanced rotatorily, the melt portion size also can be adjusted here. The rotation of the splitter head 9 can be effected by a suitable rotary drive 17, which in principle can be formed in various ways, for example in the form of an electric motor with an associated gear stage, so as to be able to adjust the desired speed and possibly also vary the same.

As shown in FIG. 9, separating means 12 are stationarily arranged on the outlet side of the splitter head 8, which during the rotation of the splitter head 8 sweep over the outlet openings of the melt channels and separate the melt strands emerging there. In the embodiment depicted in FIG. 9, said separating means 12 can comprise a cutting or shearing tool 19, which for example can be formed as strip which is directly seated on the outlet side of the splitter head 8 and sweeps over the outlet openings of the melt channels, when the splitter head 8 is rotated, cf. FIG. 9.

Figure 10:
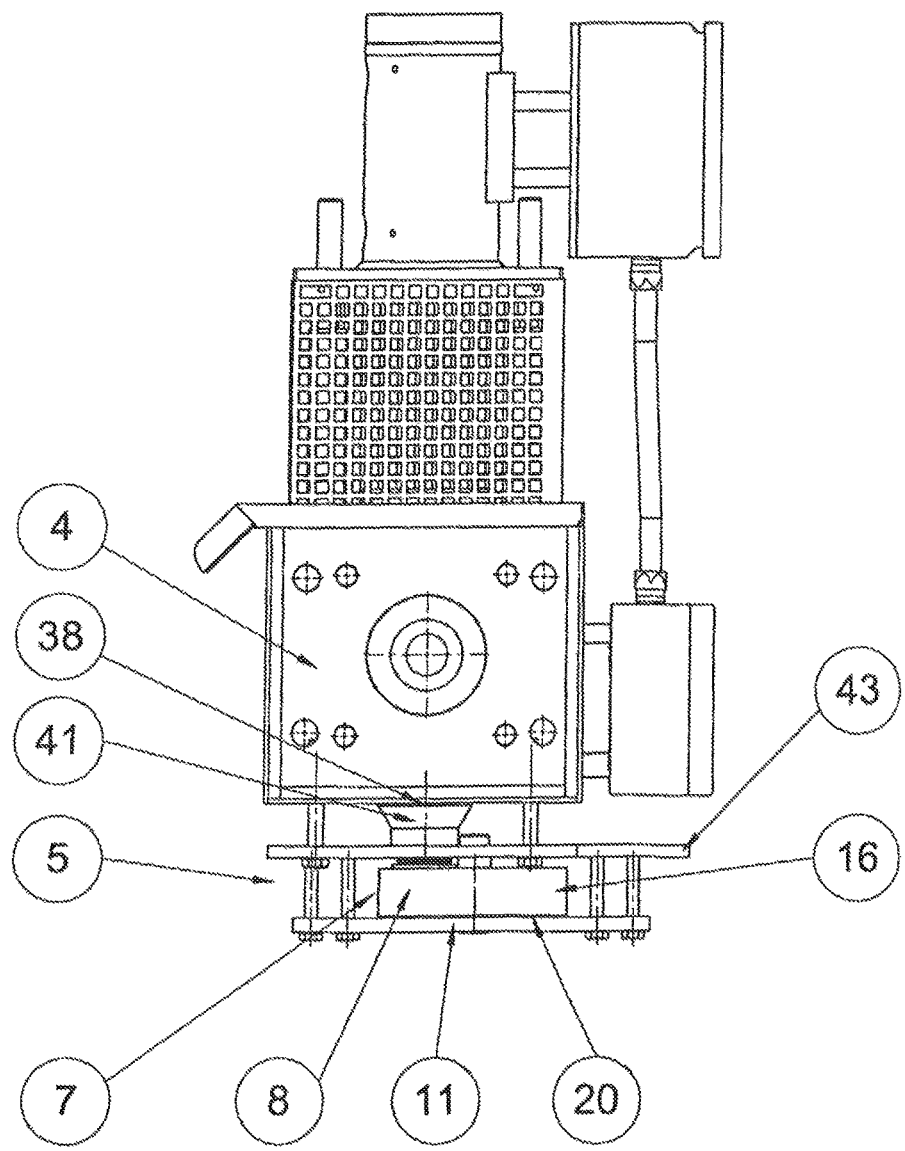
FIG. 10: shows a side view of a portioning device associated to the diverter valve according to a further advantageous embodiment of the invention, which comprises a rotatingly drivable splitter head to which a stationary shear blade with only one passage recess is associated.
Figure 11:
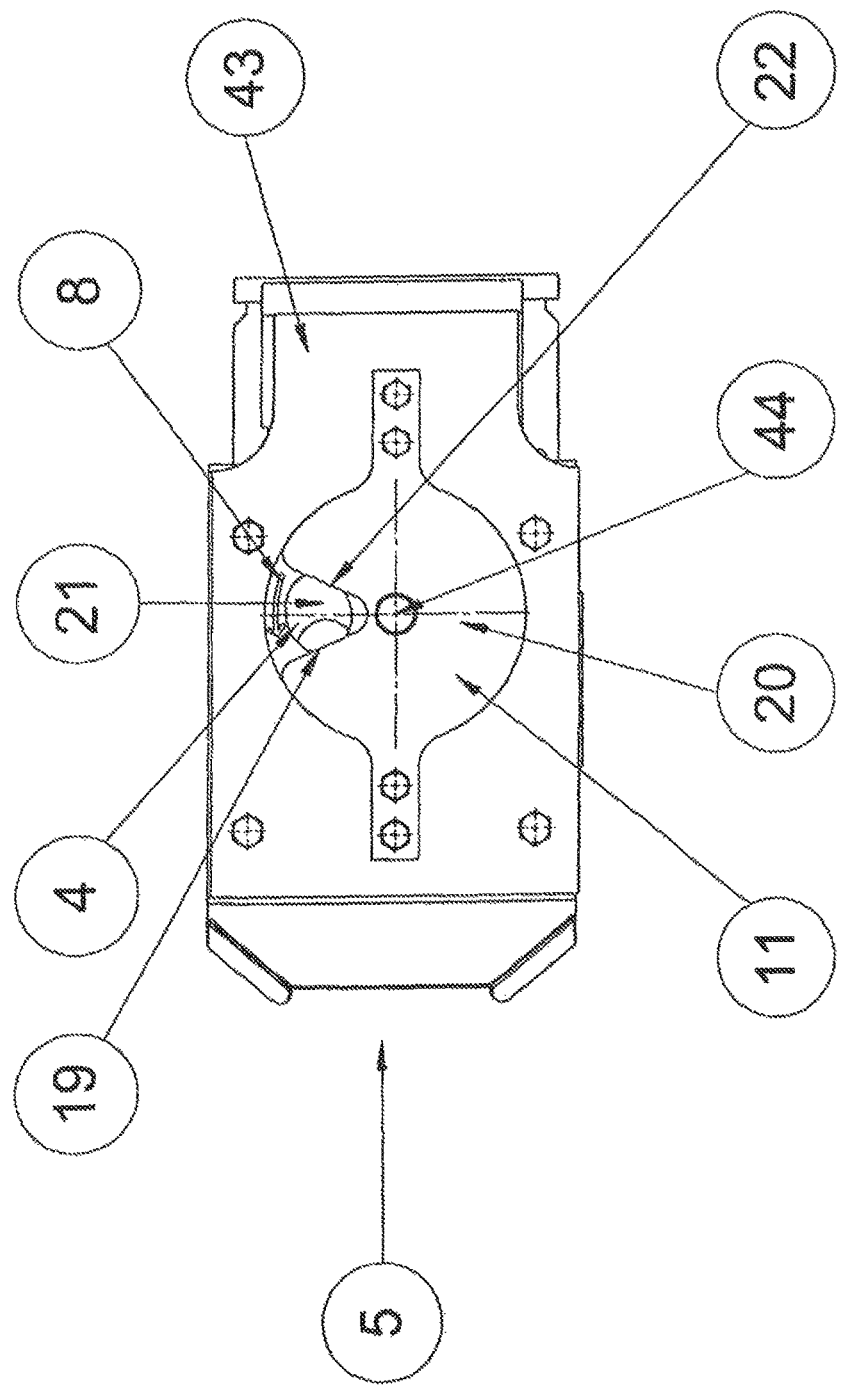
FIG. 11: shows a perspective representation of the portioning device of FIG. 10, wherein the shear blade is shown obliquely from below.

As shown in FIGS. 10 and 11, the separating means 12 can however also form shut-off means 11 which close a part of the melt channels 9 and 10 in the splitter head 8 on the outlet side and clear only one melt channel 9 each on the outlet side. For this purpose, said cutting or shearing tool 19 can be formed in the form of a cutting or shear plate 20 which substantially covers the entire outlet side of the splitter head 9 and only comprises a limited passage recess 21, which in its size approximately corresponds to the outlet cross-section of the melt channels 9 and 10 or is formed slightly larger, so that only one melt channel each is cleared when the same is in the region of the passage recess 21, while the remaining melt channels 9 and 10 are closed. The cutting or shear plate 20 therefore is directly seated on the flat outlet side of the splitter head 8, wherein a flush fit can be provided.

Said cutting or shear plate 20 is stationarily arranged, so that the relative movement to the splitter head 8 is effected by the rotary movement of the splitter head 8. Alternatively or in addition, the cutting or shear plate 20 might also be driven rotatorily by a suitable rotary drive. As shown in FIG. 11, the passage recess 21 is defined by an edge portion 22 of the cutting or shear plate 20, which forms a cutting and/or shearing edge by which the emerging melt can be cut off or sheared off. Moreover, the embodiment of FIGS. 10 and 11 substantially corresponds to the embodiment of FIGS. 8 and 9.

Figure 12:
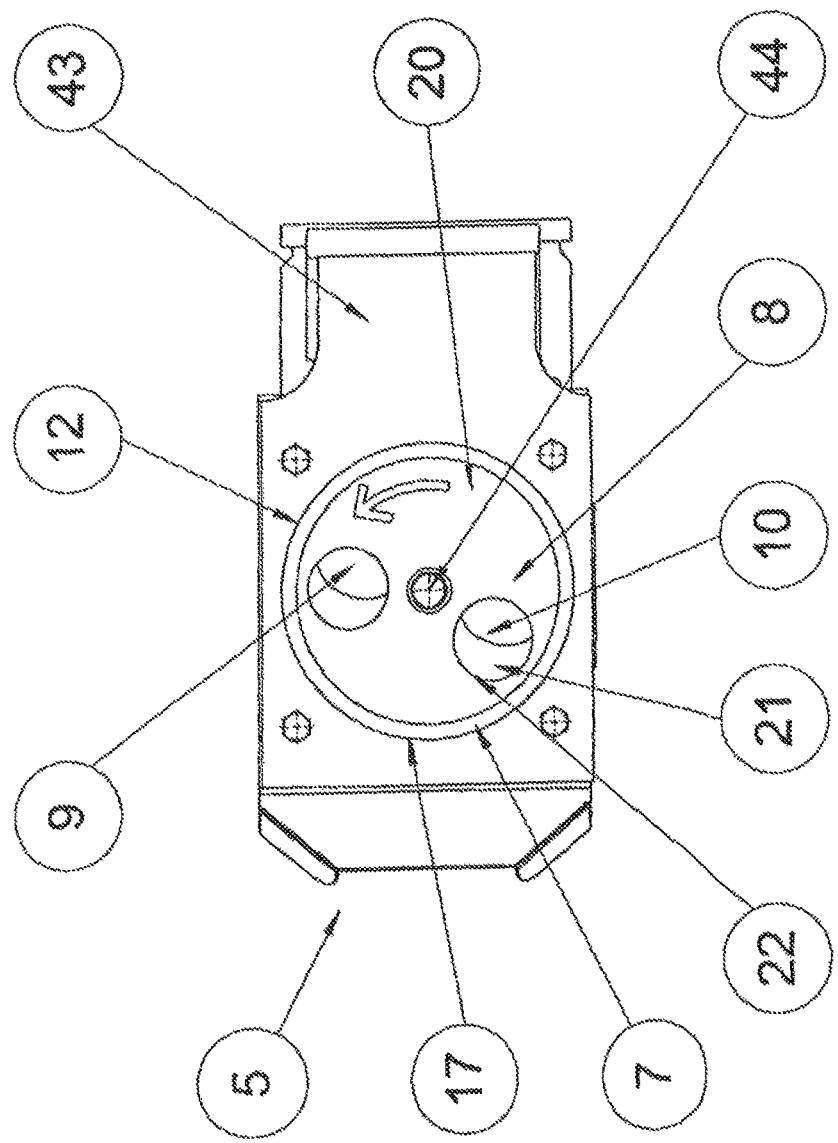
FIG. 12: shows a perspective representation of a portioning device associated to the diverter valve, which comprises a stationary splitter head to which a rotatingly drivable shear blade in the form of a die plate is associated.

As shown in FIG. 12, the splitter head 8 with the plurality of melt channels 9 and 10 can also be arranged stationarily, i.e. be mounted unmovably relative to the diverter valve 4, wherein here the plurality of melt channels 9 and 10 have a common inlet region which is in flow connection with the outlet opening 38 of the diverter valve 4 and then bifurcates into the plurality of melt channels 9 and 10.

The splitting or portioning of the outflowing melt is effected by the rotatorily drivable cutting or shear plate 20.

In principle, the rotary drive 17 for driving the cutting or shear plate 20 can be formed in different ways, for example comprise an electric motor and possibly a gear stage, in order to be able to drive the shear plate in the desired way with variable speed.

In the depicted embodiment, the cutting or shear plate comprises two passage recesses 21, which depending on the rotary position get in alignment with the orifice of the melt channels 9 or 10 of the splitter head 8. Advantageously, the splitter head 8 can comprise a buffer chamber of sufficiently dimensioned volume in its interior, in which melt flowing in from the diverter valve 4 can be accommodated or buffered, whereas the cutting or shear plate closes the outflow channels.

Figure 13:
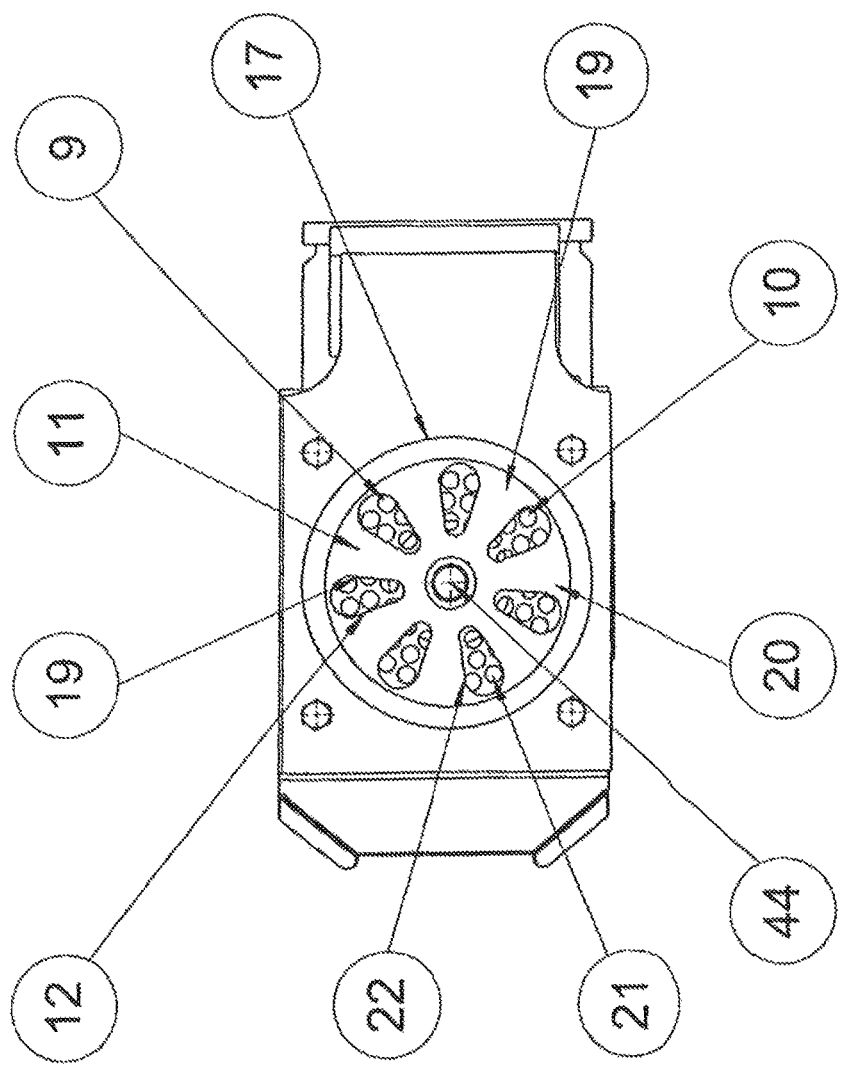
FIG. 13: shows a perspective representation of a portioning device associated to the diverter valve according to a further advantageous embodiment of the invention, which comprises a stationarily arranged splitter head with a plurality of melt channels in the manner of a shower, to which a rotatorily drivable shear blade in the form of a die plate is associated.

The embodiment of FIG. 13 in principle is similar to the embodiment of FIG. 12. The splitter head 8 also is stationarily arranged and a cutting or shear plate 20 rotatably arranged thereto is provided, which can rotate over the orifice side of the splitter head 8 and can rotatorily be driven by a corresponding rotary drive 17 not specifically shown. As compared to the embodiment of FIG. 12, the splitter head 8 comprises a larger number of melt channels, which in FIG. 13 are designated with the numerals 9 and 10, but where very much more than only two of such melt channels are provided, for example more than 20 and possibly also more than 50. In particular, the splitter head 8 can be formed similar to a shower or a shower head.

As compared to the melt channels, the cutting or shear plate 20 comprises very much larger passage recesses 21, which can be arranged and formed such that a plurality of melt channels 9 or 10 each are cleared at the same time, and with a corresponding rotary position of the cutting or shear plate 20 the passage recess 21 is in an aligned position. Here as well, the edge portions 22 of the cutting or shear plate 20 enclosing the passage recesses 21 form cutting or shearing edges which cut off or shear off the emerging melt strand.

In this embodiment, the plurality of melt channels can have a common inlet region or advantageously be in flow connection with a distributor chamber, into which melt discharged from the diverter valve 4 is introduced.

The melt clots split or portioned in the described way are cooled by a cooling device 6 shown in FIGS. 1 and 2 and/or are cooled during and/or after portioning, in order to effect and/or accelerate the solidification of the melt to obtain chunks of material. In an advantageous development of the invention, said cooling device can comprise various cooling means which can be provided alone or in various combinations with each other.

As shown in FIG. 2, the cooling device 6 in particular can comprise cooling means 33 which cool the melt directly on portioning or directly after portioning. Said cooling means 33 for example can be formed as spray cooling means, which spray a cooling liquid onto the emerging melt strand which exits from the splitter 7. Alternatively or in addition, said cooling means 33 also might comprise an air or gas cooler which directs cooling air or cooling gas onto the melt strand. Alternatively or in addition, the cooling means 33 in turn also can comprise a contact cooler which has a cooling surface which gets in contact with the melt strand. For example, the splitter head 8 and/or the diverter valve 4, in particular its discharge side, can be cooled in a suitable way, for example by a liquid circuit cooling, so that the melt is precooled already when it is portioned, so that the melt possibly also has already started to solidify when if is portioned.

Furthermore, the cooling device 6 advantageously comprises at least one cooling station downstream of the portioning device 5, in particular in the form of a cooling bath 23 which is arranged below the portioning device 5, so that the split melt portions can fall directly into said cooling bath by gravity. The cooling bath 23 can be formed with one circuit or also with two circuits as required in the manner described above, so as to be able to maintain the desired coolant temperature, in said cooling bath 23 a solidification of the melt portions is effected to obtain handleable chunks of material 39.

When using an underwater pelletizer as processing plant, as shown in FIG. 1, the water or liquid circuit 36 of the underwater pelletizer advantageously can also be used for tempering and/or cooling the cooling bath 23 and/or a further cooling bath 24. As shown in FIG. 1, heat can be removed from the cooling bath 23 via heat exchangers 46 and 47 and be used for preheating the water circuit 36, wherein said water circuit 36 and its cooling means also can simply be used only for cooling or tempering the cooling bath 23 on demand. Alternatively or in addition, the heat withdrawn from the cooling bath 23 and/or the cooling bath 24 via a heat exchanger 48 can also be used for preheating for example drying air used in a downstream drying station 30.

To be able to separate the chunks of material 39 from the liquid of the cooling bath 23, a removal conveyor 25 is provided in accordance with a development of the invention, which advantageously can be formed as belt conveyor 28 and advantageously can comprise a belt portion extending in the cooling bath 23, in particular below its level, and a belt portion extending outside the cooling bath 23.

Figure 14:
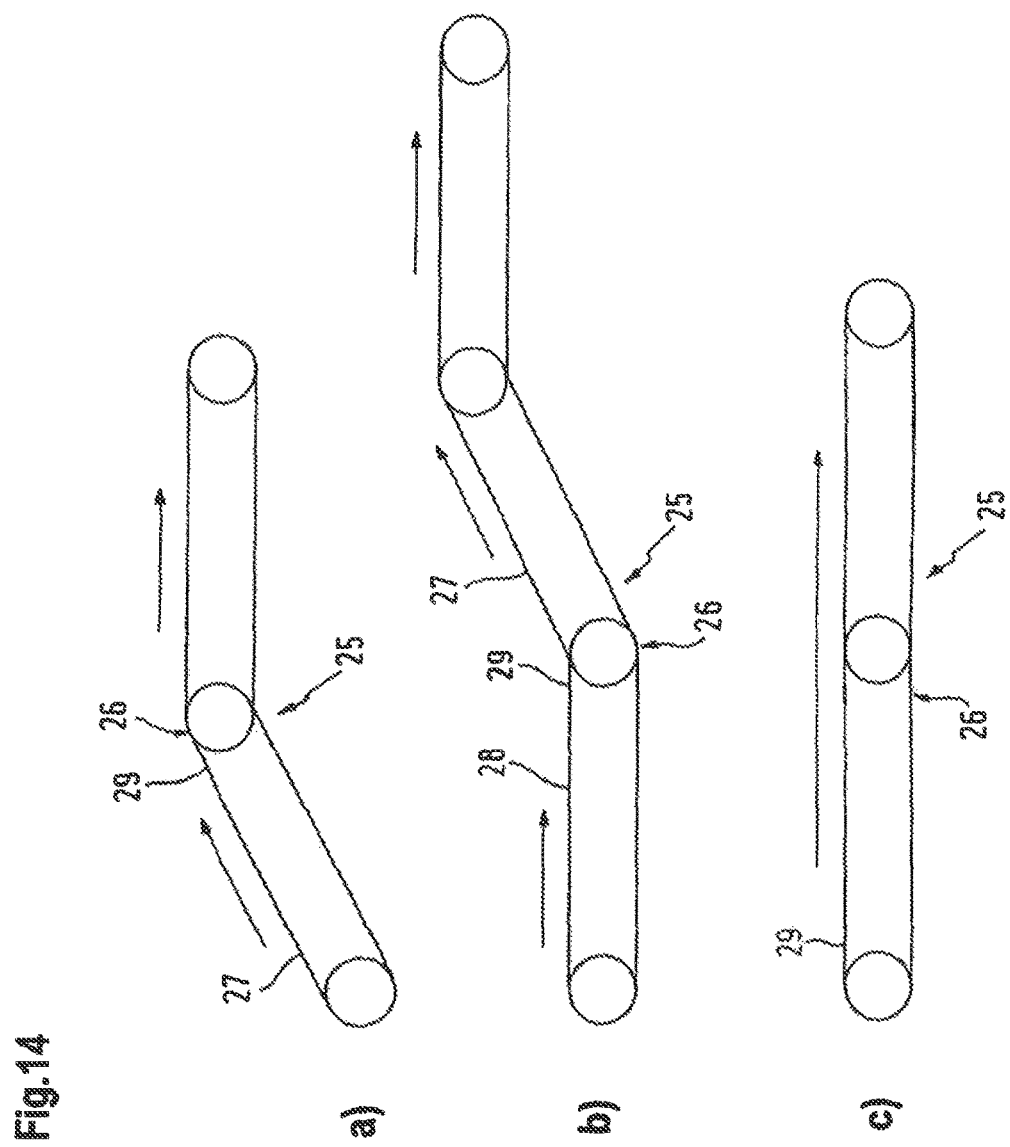
FIG. 14 shows a schematic representation of various embodiments of the removal conveyor for removing the portioned melt or chunks of material, wherein the partial view a) shows a configuration of the removal conveyor for collecting chunks of material floating in a cooling bath, the partial view b) shows a configuration of the removal conveyor for chunks of material not floating in a cooling bath, and the partial view c) shows a configuration of the removal conveyor for air or spray cooling.

As shown in FIG. 14, the belt conveyor 26 advantageously can comprise a collecting portion 27 inclined at an acute angle to the horizontal, which passes through the level of the cooling bath 23 and collects chunks of material 39 floating on the cooling bath 23 and removes the same from the cooling bath 23, cf. FIG. 14, partial view a).

Alternatively or in addition, said belt conveyor 26 also can comprise a collecting portion 28 arranged on the bottom of the cooling bath 23, so as to be able to collect and carry away chunks of material 39 sinking or going down. Such bottom-side collecting portion 28 possibly can be combined with a collecting portion 27 for collecting and carrying away floating chunks of material 39, cf. partial view b) of FIG. 14.

Alternatively or in addition, a substantially flat formation of the removal conveyor 25 can also be provided, for example when a cooling bath 23 is omitted and instead an air or spray cooling is provided.

Such air and spray cooling can also be provided when a cooling bath 23 is provided, for example in the region of the portion of the removal conveyor 25 extending outside the cooling bath 23. Such further cooling means 45 for cooling the chunks of material 29 transported out of the cooling bath 23 are shown with reference numeral 45 in FIG. 2.

Alternatively or in addition, a further cooling bath 24 can be provided downstream of the cooling bath 23, which advantageously can have a larger volume than the first or preceding cooling bath 23 and/or a lower coolant temperature.

As shown in FIG. 1, a removal conveyor 25 again is associated to the further cooling bath 24, so that the again immersion- and/or floating-cooled chunks of material 39 can be separated and carried away from the bath.

After the last cooling bath, further cooling means, in particular also a drying device 30, can be associated to or provided downstream of the removal conveyor 25. As described above, this drying device 30 can be a stationary drying station 31 for example in the form of a centrifugal drier, into which the removal conveyor 25 supplies the chunks of material 39 for drying. Alternatively or in addition, the drying device 30 also can operate in throughfeed and comprise a continuous drier 32 through which the removal conveyor 25 moves the chunks of material 39, i.e. the chunks of material 39 are dried, while they are removed and transported further. As described above, such continuous drier 32 for example can comprise a fan cooling or a spray cooling or the like.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A melt processing plant comprising:
   a melt charger for charging a processing head with melt;
   a diverter valve located upstream of the processing head and associated with the melt charger for diverting the melt away from the processing head and discharging the melt during at least one of a start-up phase and a retooling phase;

a portioning device associated with the diverter valve for portioning the discharged melt into melt portions;

a cooling device for cooling the melt portions to at least partly solidified chunks of material, said cooling device including a cooling basin containing a volume of cooling liquid to form a cooling bath having a liquid level, said cooling bath being arranged vertically below the portioning device so that said melt portions free fall by gravity into said cooling bath to form at least partly solidified chunks of material; and a removal conveyor associated with the cooling bath for removing the at least partly solidified chunks of material from the cooling bath, said removal conveyor including a belt conveyor having a first collecting belt portion inclined at an acute angle to the horizontal and extending through the liquid level of the cooling bath for collecting and removing from said cooling bath at least partly solidified chunks of material contained in said cooling liquid in said cooling basin.

2. The melt processing plant according to claim 1, wherein the portioning device includes a splitter for splitting a melt strand flowing out of the diverter valve into melt portions of about equal size.

3. The melt processing plant according to claim 2, wherein the splitter includes a splitter head with a plurality of melt channels in flow connection with a discharge opening of the diverter valve, and a shut-off element for cyclically shutting off and clearing the melt channels.

4. The melt processing plant according to claim 3, wherein a controller is provided for controlling the shut-off element such that there is always at least one melt channel at least partly opened.

5. The melt processing plant according to claim 4, wherein the shut-off element is formed such that the melt channels are shut off and cleared in alternation such that when a melt channel is opened at least one other melt channel is closed.

6. The melt processing plant according to claim 4, wherein the splitter head is movably mounted relative to the diverter valve such that depending on a position of the splitter head another melt channel can be brought into flow connection with the discharge opening of the diverter valve.

7. The melt processing plant according to claim 6, wherein the splitter head is part of a carriage which can be reciprocatingly driven by a carriage drive.

8. The melt processing plant according to claim 3, wherein the splitter head is part of a rotary head that is rotatorily driven by a rotary drive.

9. The melt processing plant according to claim 3, wherein the splitter head is unmovably attached to the diverter valve and the shut-off element is movably mounted relative to the splitter head.

10. The melt processing plant according to claim 3, wherein a controller is provided for variably controlling at least one of a speed of movement and a movement frequency of the splitter head relative to the diverter valve in dependence on one of a chunk size and a volumetric flow rate of the melt.

11. The melt processing plant according to claim 3, wherein a controller is provided for variably controlling at least one of a speed of movement and a movement frequency of the shut-off element relative to the splitter head in dependence on one of a chunk size and a volumetric flow rate of the melt.

12. The melt processing plant according to claim 3, wherein an intermediate piece is provided between the splitter head and the diverter valve that includes a connecting channel which is connectable to a discharge opening of the diverter valve and can be brought in flow connection with the melt channels in the splitter head, said connecting channel having at least one of a nozzle shaped contour and a cross sectional taper provided on an outlet side.

13. The melt processing plant according to claim 3, wherein the shutoff element includes a cutting/shearing tool movable through the melt strand to be separated transversely to the longitudinal direction of the melt channel for shearing/cutting off the melt strand.

14. The melt processing plant according to claim 13, wherein the cutting/shearing tool includes a cutting/shear plate which is seated on a splitter head surface onto which the melt channels of the splitter head open and is movably mounted relative to the melt channels parallel to said splitter head surface such that depending on the relative position of the cutting/shear plate of the splitter head, a respective melt channel orifice is cleared or blocked.

15. The melt processing plant according to claim 14, wherein the cutting/shear plate includes at least one passage recess which can at least partly be brought in alignment with the orifices of the melt channels of the splitter head, wherein an edge portion defining the passage recess forms a cutting/shearing edge.

16. The melt processing plant according to claim 15, wherein the cooling bath further includes a secondary cooling circuit with a heat exchanger arranged outside the cooling bath for cooling liquid in said cooling bath in which the melt portions are cooled.

17. The melt processing plant according to claim 1, further comprising a heat recovery device associated with the cooling device for recovering heat to be withdrawn from the chunks of material, said heat recovery device including at least one of a heat storage component and a heat transmitting component.

18. The melt processing plant according to claim 17, wherein the heat recovery device includes at least one heat exchanger for recovering heat obtained in the cooling bath.

19. The melt processing plant according to claim 1, wherein the removal conveyor includes a second collecting belt portion arranged at a bottom of the cooling basin for collecting chunks of material sinking down in the cooling bath.

20. The melt processing plant according to claim 1, wherein the removal conveyor includes a liquid-permeable circulating component.

21. The melt processing plant according to claim 20, wherein the circulating component is a perforated belt.

22. The melt processing plant according to claim 1, further comprising a drying device for at least partly drying the chunks of material removed by the removal conveyor, said drying device including a drying station downstream of the removal conveyor that includes one selected from the group consisting of a centrifugal dryer, a cyclone separator, a moving dryer, and a continuous dryer.

23. The melt processing plant according to claim 1, further comprising a cooler effective in a region of the portioning device for cooling the melt during and/or directly after portioning and before reaching the cooling basin, the cooler including at least one selected from the group consisting of an air cooler for charging the melt with cooling air, a gas cooler for charging the melt with cooling gas, a liquid cooler for charging the melt with a cooling liquid and a contact cooler with a cooling surface to be contacted by the melt.

24. The melt processing plant according to claim 1, wherein the diverter valve includes at least one inlet channel for connection with the melt charger, at least one feed channel for connection with the at least one processing head, and a discharge channel with a discharge opening for discharging the melt past the processing head, wherein by shifting a movable valve body the at least one inlet channel can selectively be brought in flow connection with one of the feed channels or with the discharge channel.

25. A method for processing melt in a melt processing plant comprising the steps of:
- in a processing mode, conveying melt from at least one melt charger via a diverter valve to at least one processing head for processing;
- in a starting and/or retooling mode, diverting by the diverter valve at least one of melt to be recycled and melt which is unsuitable for processing past the at least one processing head;
- portioning the melt diverted from the processing head by the diverter valve into melt portions by a portioning device that is associated with a discharge channel of the diverter valve;
- causing said melt portions to free fall by gravity into a cooling basin arranged vertically below the portioning device, the cooling basin containing a volume of cooling liquid at a liquid level to form a cooling bath in said basin in which the melt portions free falling by gravity from the portioning device are immersed;
- cooling said melt portions in said cooling bath to obtain at least partly solidified chunks of material; and
- removing the at least partly solidified chunks of material contained in the cooling bath using a removal conveyor associated with the cooling bath, said removal conveyor including a belt conveyor having a first collecting belt portion inclined at an acute angle to the horizontal and extending through the liquid level of the cooling bath for collecting said at least partly solidified chunks of material contained in the basin and removing said chunks from the cooling bath.

* * * * *